US007859150B2

(12) United States Patent
Utsunomiya et al.

(10) Patent No.: US 7,859,150 B2
(45) Date of Patent: Dec. 28, 2010

(54) COMPACT STRUCTURE OF STARTER

(75) Inventors: Yamato Utsunomiya, Kariya (JP); Kazuhiro Andoh, Okazaki (JP); Tadahiro Kurasawa, Chita-gun (JP)

(73) Assignee: Denso Corporation, Kariya (JP)

( * ) Notice: Subject to any disclaimer, the term of this patent is extended or adjusted under 35 U.S.C. 154(b) by 171 days.

(21) Appl. No.: 11/979,441

(22) Filed: Nov. 2, 2007

(65) Prior Publication Data

US 2008/0106166 A1 May 8, 2008

(30) Foreign Application Priority Data

Nov. 2, 2006 (JP) ............................ 2006-298941

(51) Int. Cl.
*H02K 7/10* (2006.01)
*H02K 49/00* (2006.01)
*F02N 15/00* (2006.01)

(52) U.S. Cl. ......................... 310/75 R; 310/90; 310/91; 310/99; 310/100; 74/6; 74/7 A; 74/7 B; 290/48

(58) Field of Classification Search ................... 310/99, 310/91, 75 R, 100; 290/48; 74/6, 7 A, 7 B; *H02K 7/10, H02K 49/00; F02N 15/00*

See application file for complete search history.

(56) References Cited

U.S. PATENT DOCUMENTS

| | | | |
|---|---|---|---|
| 1,761,518 A * | 6/1930 | Chryst | 148/220 |
| 3,955,427 A * | 5/1976 | Squires | 74/6 |
| 4,104,926 A * | 8/1978 | Wilson | 74/6 |
| 4,295,069 A * | 10/1981 | Givan et al. | 310/67 R |
| 5,012,686 A * | 5/1991 | Morishita et al. | 74/7 A |
| 5,231,307 A * | 7/1993 | Yumiyama et al. | 290/48 |
| 5,277,075 A * | 1/1994 | Sakamoto et al. | 74/7 R |
| 5,469,753 A * | 11/1995 | Vadin-Michaud et al. | 74/7 A |
| 5,814,896 A * | 9/1998 | Araki | 290/38 R |
| 5,848,551 A | 12/1998 | Ohmi et al. | |

(Continued)

FOREIGN PATENT DOCUMENTS

| | | |
|---|---|---|
| DE | 19706615 A1 | 9/1997 |

(Continued)

OTHER PUBLICATIONS

Martin W. Stockel et al., "Auto Fundamentals", The Goodheart-Willcox Company, Inc., pp. 290-300 (2000).

(Continued)

*Primary Examiner*—Quyen Leung
*Assistant Examiner*—John K Kim
(74) *Attorney, Agent, or Firm*—Oliff & Berridge, PLC

(57) ABSTRACT

A starter which may employed in starting an engine is provided. The starter includes an electromagnetic actuator and a pinion carrier. The pinion carrier includes a pinion and a holder. The holder retains a shift lever and transmits movement of the shift lever, as achieved by a magnetic attraction produced by the electromagnetic actuator, to the pinion, thereby shifting the pinion into engagement with a ring gear joined to, for example, an engine. The holder is made of material smaller in specific gravity than the pinion. Specifically, the holder is lower in mass or weight than the pinion, thereby permitting the magnetic attraction required to shift the pinion carrier through the shift lever to be decreased. This permits the electromagnetic actuator to be decreased in size.

6 Claims, 4 Drawing Sheets

U.S. PATENT DOCUMENTS

| | | | |
|---|---|---|---|
| 5,895,993 | A | 4/1999 | Kajino et al. |
| 5,898,229 | A | 4/1999 | Murata et al. |
| 2003/0101833 | A1* | 6/2003 | Monroe et al. ................ 74/7 R |
| 2007/0137325 | A1 | 6/2007 | Murase et al. |
| 2008/0106166 | A1* | 5/2008 | Utsunomiya et al. .......... 310/99 |

FOREIGN PATENT DOCUMENTS

| | | |
|---|---|---|
| FR | 2 754 857 A1 | 4/1998 |
| JP | UM-A-S62-184171 | 11/1987 |
| JP | UM-A-H01-131873 | 9/1989 |
| JP | A-09-170537 | 6/1997 |
| JP | A-09-209890 | 8/1997 |
| JP | A-2002-364502 | 12/2002 |
| JP | A-2002-372069 | 12/2002 |

OTHER PUBLICATIONS

Korean Office Action dated May 27, 2009.

Chinese Office Action dated Jun. 5, 2009 with English-language translation.

May 7, 2010 German Office action for German Patent Application No. 10 2007 051 346.3-15 (with translation).

Japanese Office Acton issued in Japanese Application No. 2006-298941, dated Feb. 2, 2010 with English Translation.

* cited by examiner

COMPACT STRUCTURE OF STARTER

CROSS REFERENCE TO RELATED DOCUMENT

The present application claims the benefits of Japanese Patent Application No. 2006-298941 filed on Nov. 2, 2006, the disclosure of which is incorporated herein by reference.

BACKGROUND OF THE INVENTION

1. Technical Field of the Invention

The present invention relates generally to a starter which may be employed in starting an automotive engine, and more particularly to a compact structure of such a starter equipped with a pinion carrier which is to be shifted by a magnetic attraction, as transmitted from an electromagnetic switch through a shift lever, to establish engagement of a pinion with a ring gear jointed to an object to be started.

2. Background Art

FIG. 6 illustrates one of typical engine starters, as disclosed in Japanese Patent First Publication No. 9-209890 (U.S. Pat. No. 5,898,229). The starter includes an electric motor 100, a clutch 110, an output shaft 120, a spline tube 130, an electromagnetic switch 150, and a pinion 140. The motor 100 produces torque which is transmitted to the output shaft 120 through the clutch 110. The spline tube 130 is fitted on an outer periphery of the output shaft 120 through helical splines. The pinion 140 is formed integrally on the spline tube 130. When energized, the electromagnetic switch 150 produces a magnetic attraction which moves a shift lever 160 to push the spline tube 130 toward an internal combustion engine (i.e., rightward, as viewed in the drawing) to bring the pinion 140 into engagement with a ring gear 170 of the engine.

The above structure of the starter, however, has the following drawbacks.

The pinion 140 and the spline tube 130 are, as described above, formed integrally with each other and made of material such as iron which is relatively high in specific gravity and mechanical strength. A total mass of the pinion 140 and the spline tube 130 will, thus, be high. When it is required to increase the distance L between an engine-mount surface of an starter housing 180 and the static position of the pinion 140 (i.e., the top end surface of the pinion 140), the length of the spline tube 130 needs to be increased, thus resulting in an increase in mass of the spline tube 130, which will require an increase in power (i.e., the magnetic attraction) of the electromagnetic switch 150 for moving the spline tube 130 through the shift lever 160. This results in an increased size of the electromagnetic switch 150.

The shift lever 160 has an end placed in abutment with a surface 131 of a flange of the spline tube 130 through a small contact area, so that the pressure acting on the surface of the end of the shift lever 160 will be high. Therefore, in the case where the shift lever 160 is made of resin for saving the weight and production cost thereof, it will result in an increase in mechanical wear of the end of the shift lever 160 resulting from the friction with the rotating surface 131 of the spline tube 130. This results in a decrease in amount by which the shift lever 160 moves the pinion 140 toward the engine, which may lead to a failure in engagement of the pinion 140 with the ring gear 170.

SUMMARY OF THE INVENTION

It is therefore a principal object of the invention to avoid the disadvantages of the prior art.

It is another object of the invention to provide an improved structure of a starter which is permitted to be decreased in size and/or designed to have an increased durability of a shift lever.

According to one aspect of the invention, there is provided a starter which may be employed in starting an automotive engine. The starter comprises: (a) a motor working to produce torque for starting a given object; (b) an output shaft to which the torque, as produced by the motor, is transmitted; (c) a pinion carrier including a pinion that is fit on an outer periphery of the output shaft and a holder; (d) a shift lever; and (e) an electromagnetic actuator which, when energized, produces a magnetic attraction acting on the shift lever to shift the pinion carrier to bring the pinion into engagement with a ring gear joined to the object to transmit the torque to the object. The holder of the pinion carrier holds the shift lever to establish a connection between the shift lever and the pinion, the holder being made of material smaller in specific gravity than the pinion.

Specifically, the holder is lower in mass or weight than the pinion, thereby permitting the magnetic attraction, as produced by the electromagnetic actuator, required to shift the pinion carrier toward the ring gear through the shift lever to be decreased. This permits the electromagnetic actuator to be decreased in size.

In the preferred mode of the invention, the pinion and the holder of the pinion carrier may be joined together to be rotatable relative to each other.

The holder may be made of resin and snap-fit on the pinion elastically.

The pinion carrier may also include a grease reservoir which provides grease to a contact between the pinion and the holder.

The pinion and the holder may be joined together through a bearing to be rotatable relative to each other.

The pinion of the pinion carrier may have formed on an inner periphery an inner helical spline which meshes with an outer helical spline formed on the outer periphery of the output shaft.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
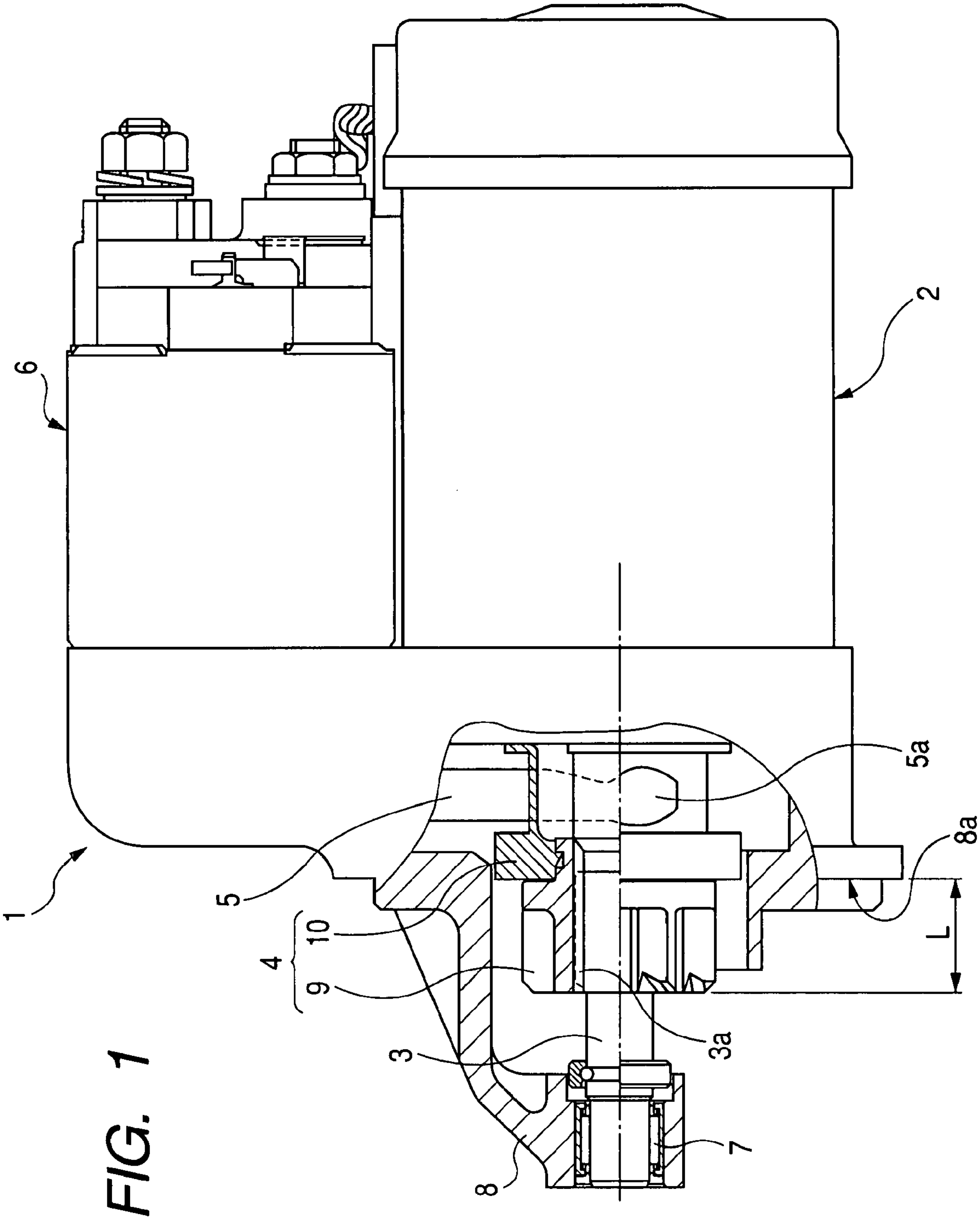
FIG. 1 is a longitudinal partial sectional view which shows an internal structure of a starter according to the first embodiment of the invention.

Referring to the drawings, wherein like reference numbers refer to like parts in several views, particularly to FIG. 1, there is shown a starter 1 according to the first embodiment of the invention which may be employed in starting an automotive internal combustion engine.

The starter 1 consists essentially of an electric motor 2, an output shaft 3, a pinion carrier 4, and an electromagnetic switch 6. The motor 2 works to produce torque which is, in turn, transmitted to the output shaft 3 through a clutch (not shown). The pinion carrier 4 is, as will be described later in detail, installed on the output shaft 3. When turned on, the electromagnetic switch 6 works as an actuator to push or shift the pinion carrier 4 to the side of an engine (i.e., a left direction, as viewed in the drawing) through a shift lever 5 and at the same time closes contacts of a main switch installed in a motor circuit for the motor 2.

When the main switch is closed by the electromagnetic switch 6, the motor 2 is supplied with electric power from a storage battery (not shown) installed in the vehicle to produce the torque. The motor 2 may be a typical dc motor.

The clutch is implemented by a typical one-way clutch which works to transmit the drive torque, as produced by the motor 2, to the output shaft 3 for starting the engine. When the engine has started, so that output of the engine is applied to the starter 1, the clutch disconnects an input and an output member thereof to block the transmission of the torque output of the engine to the motor 2.

A speed reducer may be installed between the motor 2 and the clutch. For instance, the speed reducer may be implemented by a typical epicycle reduction gear train (also called a planetary gear speed reducer) which is disposed coaxially with an armature of the motor 2 and works to reduce the speed of the motor 2 to increase and output the drive torque, as produced by the motor 2.

The output shaft 3 has a left end, as viewed in the drawing, retained rotatably by a starter housing 8 through a bearing 7 and a right end connected to the clutch.

The electromagnetic switch 6 includes a solenoid and a plunger (both not shown). The solenoid is energized upon supply of the power from the battery installed in the vehicle when a starter switch (not shown) is closed. When the solenoid is energized, it will work as an electromagnet to produce a magnetic attraction to attract the plunger inside the solenoid, thereby closing the main switch. Alternatively, when the solenoid is deenergized, it will cause the plunger to be moved backward by a return spring (not shown) to open the main switch of the motor circuit.

The shift lever 5 is made of resin and has a lever pivot (not shown) retained by the starter housing 8 to be rotatable. The shift lever 5 is joined at an end thereof far from the lever pivot to a lever hook attached to the plunger of the electromagnetic switch 6 and engages the pinion carrier 4 at the other end 5*a* thereof. When the shift lever 5 is attracted by the solenoid to the right, as viewed in the drawing, it will cause the end of the shift lever 5 joined to the lever hook to be drawn by the plunger, so that the end 5*a* of the shift lever 5 swings about the level pivot to push or shift the pinion carrier 4 away from the motor 2 toward the engine.

Figure 2:
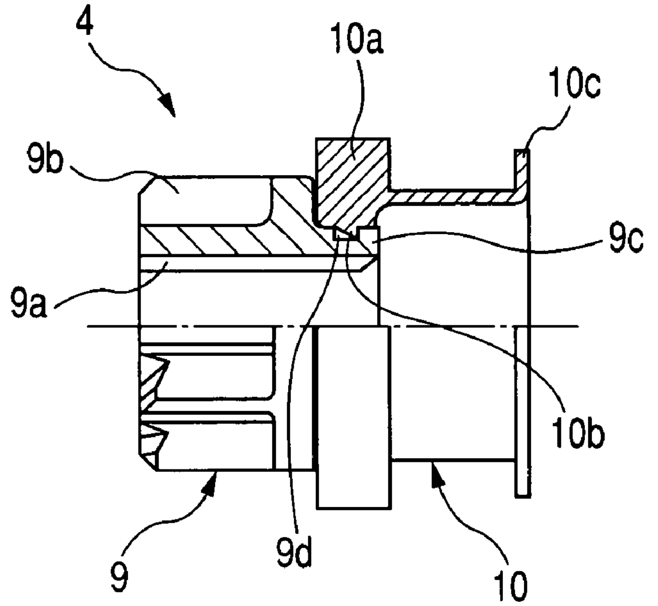
FIG. 2 is a partially sectional view which illustrates a pinion carrier installed in the starter of FIG. 1.

Referring to FIG. 2, the pinion carrier 4 consists of a pinion 9 fitted on an outer periphery of the output shaft 3 and a holder 10 that holds the end of the shift lever 5.

The pinion 9 is made of, for example, iron and has formed on an inner peripheral wall thereof an internal helical spline 9*a* meshing with an external helical spline 3*a* formed, as illustrated in FIG. 1, on an outer peripheral wall of the output shaft 3. The pinion 9 also includes teeth 9*b* which are brought into mesh with a ring gear (not shown) of the engine for starting the engine and a cylindrical portion 9*c* formed farther from the engine than the teeth 9*b*. The cylindrical portion 9*c* has a recess or groove 9*d* formed in the whole of an outer circumferential wall thereof.

The holder 10 is hollow cylindrical and made of material such as resin which is smaller in specific gravity than that of the pinion 9. The holder 10 is, as clearly illustrated in FIG. 2, snap-fit on the pinion 9 elastically to be rotatable relative to each other. Specifically, the holder 10 has an annular ring 10*a* which has an inner diameter slightly greater than an outer diameter of the cylindrical portion 9*c* of the pinion 9 and a protrusion or claw 10*b* formed on an inner periphery thereof. The claw 10*b* is fit in the groove 9*d* of the cylindrical portion 9*c* of the pinion 9 to make a firm joint of the holder 10 to the pinion 9. The fitting of the claw 10*b* is achieved by pressing the ring 10*a* against the outer periphery of the cylindrical portion 9*c* of the pinion 9 in an axial direction of the pinion 9.

The holder 10 also has a flange 10*c* extending outward from a rear end thereof far from the pinion 9 in a radius direction of the holder 10. The shift lever 5 engages at an end 5*a* thereof between the flange 10*c* and the ring 10*a*.

In operation of the starter 1, when the starter switch is closed, so that the solenoid of the electromagnetic switch 6 is energized, it will cause the plunger to be attracted by the solenoid. Such movement of the plunger is transmitted to the pinion carrier 4 through the shift lever 5, thereby causing the pinion carrier 4 to advance to the left, as viewed in FIG. 1, (i.e., toward the engine) while rotating on the output shaft 3 until the pinion 9 meshes with the ring gear.

Simultaneously, upon the movement of the plunger, the main switch of the motor circuit is closed, so that the motor 2 is supplied with the power from the battery and produces the torque through the armature thereof. The torque is, then, transmitted to the output shaft 3 through the clutch, thereby rotating the pinion 9 fitted on the output shaft 3. This causes the torque, as produced by the motor 2, to be transmitted to the ring gear from the pinion 9, thereby cranking the engine.

When the engine has been started, and the starter switch is opened, it will cause the magnetic attraction, as produced by the solenoid, to disappear, so that the plunger is returned back to the initial position thereof by the return spring, thereby opening the main switch to stop the supply of power to the motor 2 from the battery. This causes the armature of the motor 2 to be reduced in speed thereof gradually and then ultimately stopped.

Upon the backward movement of the plunger, the shift lever 5 will be moved in a direction reverse to that when starting the engine, thereby moving the pinion carrier 4 away from the engine to disengage the pinion 9 from the ring gear. When returned back to the initial position, as illustrated in FIG. 1, the pinion 9 is stopped.

The advantages, as provided by the structure of the starter 1, will be described below.

The pinion carrier 4 is, as described above, made up of the pinion 4 and the holder 10. The holder 1O is made of material such as resin which is lower in specific gravity than that of the iron-made pinion 4. Specifically, the holder 10 is lower in mass or weight than the pinion 9, thereby permitting the magnetic attraction, as produced by the solenoid of the electromagnetic switch 6, required to push the pinion carrier 4 toward the engine through the shift lever 5 to be decreased as compared with the case where the holder 10 is made of the same material (e.g., iron) as that of the pinion 9. This permits the electromagnetic switch 6 to be decreased in size.

Figure 3:
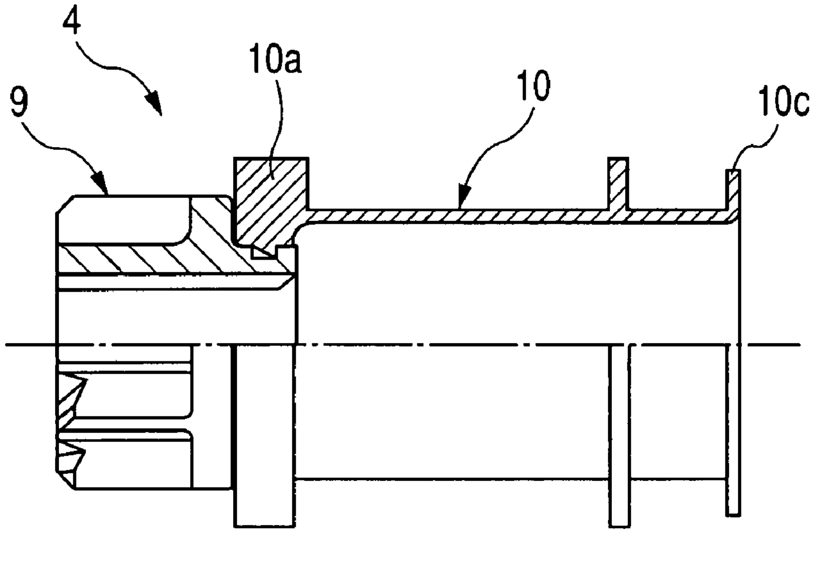
FIG. 3 is a partially sectional view which illustrates a modification of the pinion carrier of FIG. 2.

When it is required to increase the distance L between an engine-mount surface 8*s* of the starter housing 8, as illustrated in FIG. 1, and the static position of the pinion 9 (i.e., the top end surface of the pinion 9 placed in an initial position), such a requirement may be met by increasing the overall length of the holder 3, as illustrated in FIG. 3, without need for increasing the size (i.e., the mass) of the pinion carrier 4, that is, the size of the electromagnetic switch 6.

The pinion carrier 4 is so designed that the pinion 9 is rotatable relative to the holder 10, thus avoiding undesirable rotation of the holder 10 following rotation of the pinion 9, which minimizes the mechanical wear of the lever end 5*a* placed in abutment with the rear end surface of the ring 10*a*.

The holder 10 is snap-fit on the pinion 9. The fitting of the claw 10*b* is achieved easily by pressing the ring 10*a* against the outer periphery of the cylindrical portion 9*c* of the pinion 9 in the axial direction of the pinion 9 to establish elastic engagement of the claw 10*b* in the groove 9*d*.

The pinion 9 has formed on the inner peripheral wall thereof the internal helical spline 9*a* which engages the external helical spline 3*a* formed on the outer peripheral wall of the output shaft 3 to establish a mechanical joint between the pinion 9 and the output shaft 3. It is unnecessary to form an inner helical spline formed on the holder 10, thus resulting in simplified structure and facilitating the ease of production of the holder 10.

Figure 4:
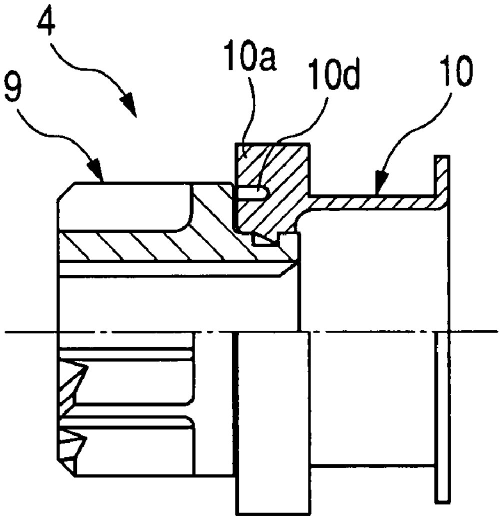
FIG. 4 is a partially sectional view which illustrates a pinion carrier according to the second embodiment of the invention.

FIG. 4 illustrates the pinion carrier 4 of the starter 1 according to the second embodiment of the invention.

The pinion carrier 4 is designed to have a grease reservoir 10*d* formed in an end of the holder 10 placed in abutment with the pinion 9. The grease reservoir 10*d* may be implemented by a recess(es) or an annular groove formed in the end surface of the holder 10. The grease reservoir 10*d* is filled with grease which lubricants a contact between the front end surface of the holder 10 and the rear end surface of the pinion 9 during relative rotation of the pinion 9 and the holder 10, thus minimizing the mechanical wear of the ring 10*a*.

The grease reservoir 10*d* may alternatively be formed in the rear end surface of the pinion 9 abutting the ring 10*a* of the holder 10.

Figure 5:
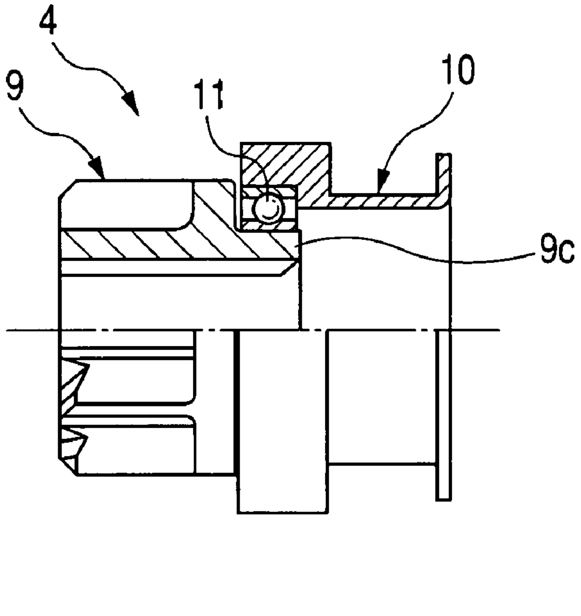
FIG. 5 is a partially sectional view which illustrates a pinion carrier according to the third embodiment of the invention.
Figure 6:
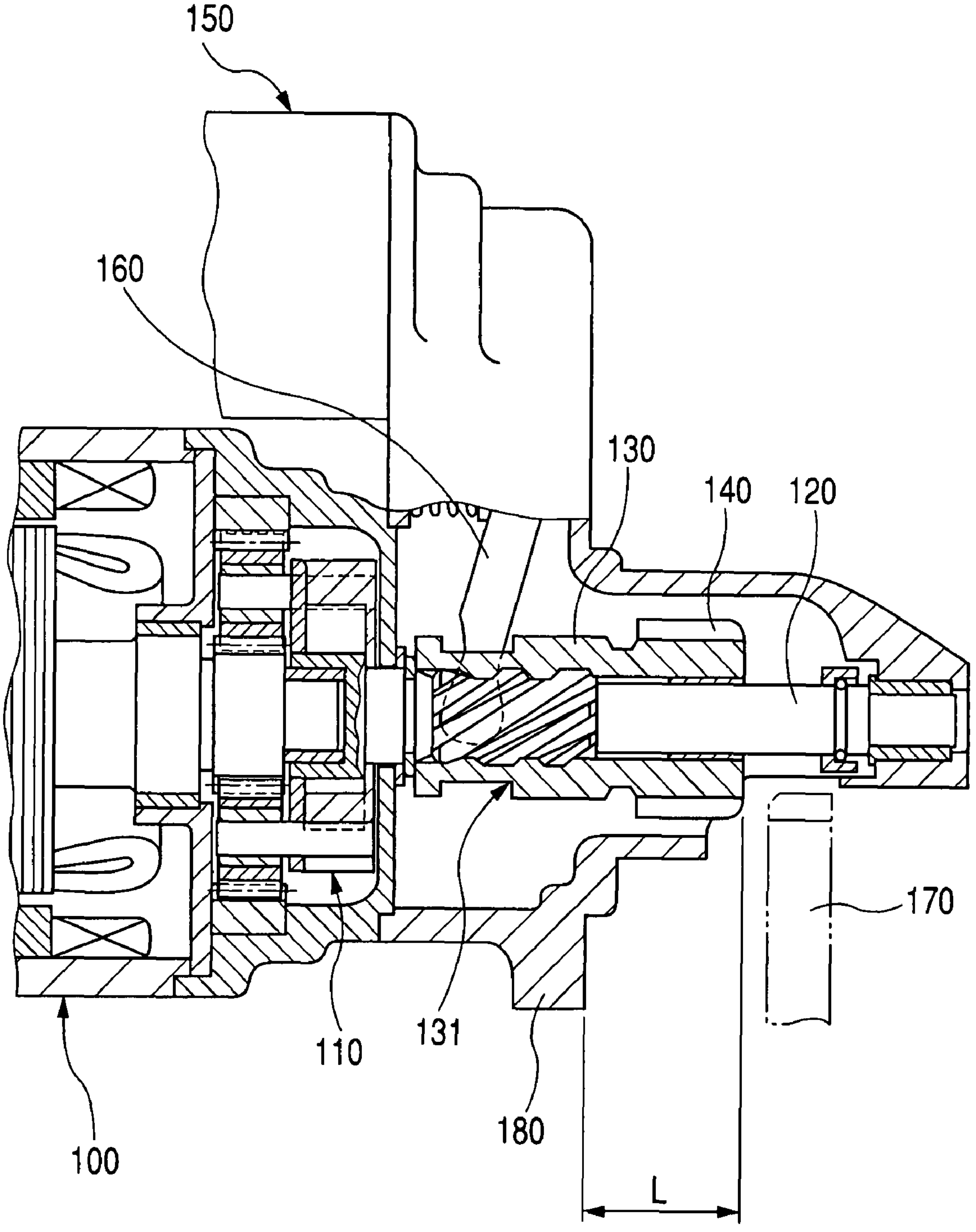
FIG. 6 (PRIOR ART)
FIG. 6 is a longitudinal partial sectional view which shows a typical starter.

FIG. 5 illustrates the pinion carrier 4 of the starter 1 according to the third embodiment of the invention.

The pinion carrier 4 is designed to have the pinion 9 joined to the holder 10 through a bearing 11 to be rotatable relative to each other.

Specifically, the holder 10 has an inner peripheral wall fitted on the cylindrical portion 9*c* of the pinion 9 through the bearing 11 such as a ball bearing, thereby minimizing the mechanical wear of the holder 10 resulting from the rotation thereof relative to the pinion 9. The use of the bearing 11 also minimizes the rotation of the holder 10 following the rotation of the pinion 9, thus decreasing the mechanical wear of the lever end 5*a* placed in abutment with the rear end surface of the ring 10*a*.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A starter comprising:

a motor that produces torque for starting a given object;

an output shaft connected at an end thereof to a clutch, the motor transmitting torque to the output shaft through the clutch;

a pinion carrier including a pinion and a holder that are fit on an outer periphery of the output shaft, the pinion and the holder being rotatably joined together;

a shift lever; and an electromagnetic actuator which, when energized, produces a magnetic attraction acting on the shift lever to shift the pinion carrier to bring the pinion into engagement with a ring gear joined to the object to transmit the torque to the object, wherein the holder of the pinion carrier holds the shift lever to establish a connection between the shift lever and the pinion, the holder being made of material smaller in specific gravity than the pinion.

2. A starter as set forth in claim 1, wherein the holder is made of resin and is elastically snap-fit on the pinion.

3. A starter as set forth in claim 2, wherein the pinion carrier also includes a grease reservoir that provides grease to a contact between the pinion and the holder.

4. A starter as set forth in claim 1, wherein the pinion and the holder are joined together through a bearing to be rotatable relative to each other.

5. A starter as set forth in claim 1, wherein the pinion of the pinion carrier is formed on an inner periphery of an inner helical spline that meshes with an outer helical spline formed on the outer periphery of the output shaft.

6. A starter as set forth in claim 1, the holder having a portion with which the shift lever engages, the portion being made of the material smaller in specific gravity than the pinion.

* * * * *